United States Patent [19]

Leonheart

[11] 4,019,402
[45] Apr. 26, 1977

[54] MOTORCYCLE THROTTLE TWIST-GRIP CONTROL

[75] Inventor: William Henry Leonheart, San Carlos, Calif.

[73] Assignee: William Henry Leonheart, San Carlos, Calif.

[22] Filed: Oct. 3, 1974

[21] Appl. No.: 511,946

[52] U.S. Cl. .............................. 74/489; 74/501 R
[51] Int. Cl.² ...................... G05G 11/00; F16C 1/12
[58] Field of Search ...................... 74/488, 489, 56; 180/33 R, 77 R

[56] References Cited
UNITED STATES PATENTS

| 733,933 | 7/1903 | Baker | 74/56 X |
| 3,856,123 | 12/1974 | Kinsey | 74/489 X |
| 3,896,680 | 7/1975 | Shoemaker | 74/489 |

FOREIGN PATENTS OR APPLICATIONS

| 216,373 | 7/1961 | Austria | 74/489 |
| 1,299,741 | 6/1961 | France | 74/489 |
| 487,113 | 11/1953 | Italy | 74/488 |
| 312,195 | 10/1933 | Italy | 74/489 |
| 644,090 | 10/1950 | United Kingdom | 74/489 |

*Primary Examiner*—Samuel Scott
*Assistant Examiner*—Frank H. McKenzie, Jr.

[57] ABSTRACT

Motorcycle throttle, twist-grip control unit is connected by a Bowden cable to the carburetor. In one form, both the inner and outer cable members are attached to pivot arms urged apart by a rotatable cam movable by the twist-grip. In another form, one of the cable parts is anchored to a lever arm and the other cable part anchored to the housing, the cam engaging the lever arm for movement thereof.

8 Claims, 7 Drawing Figures

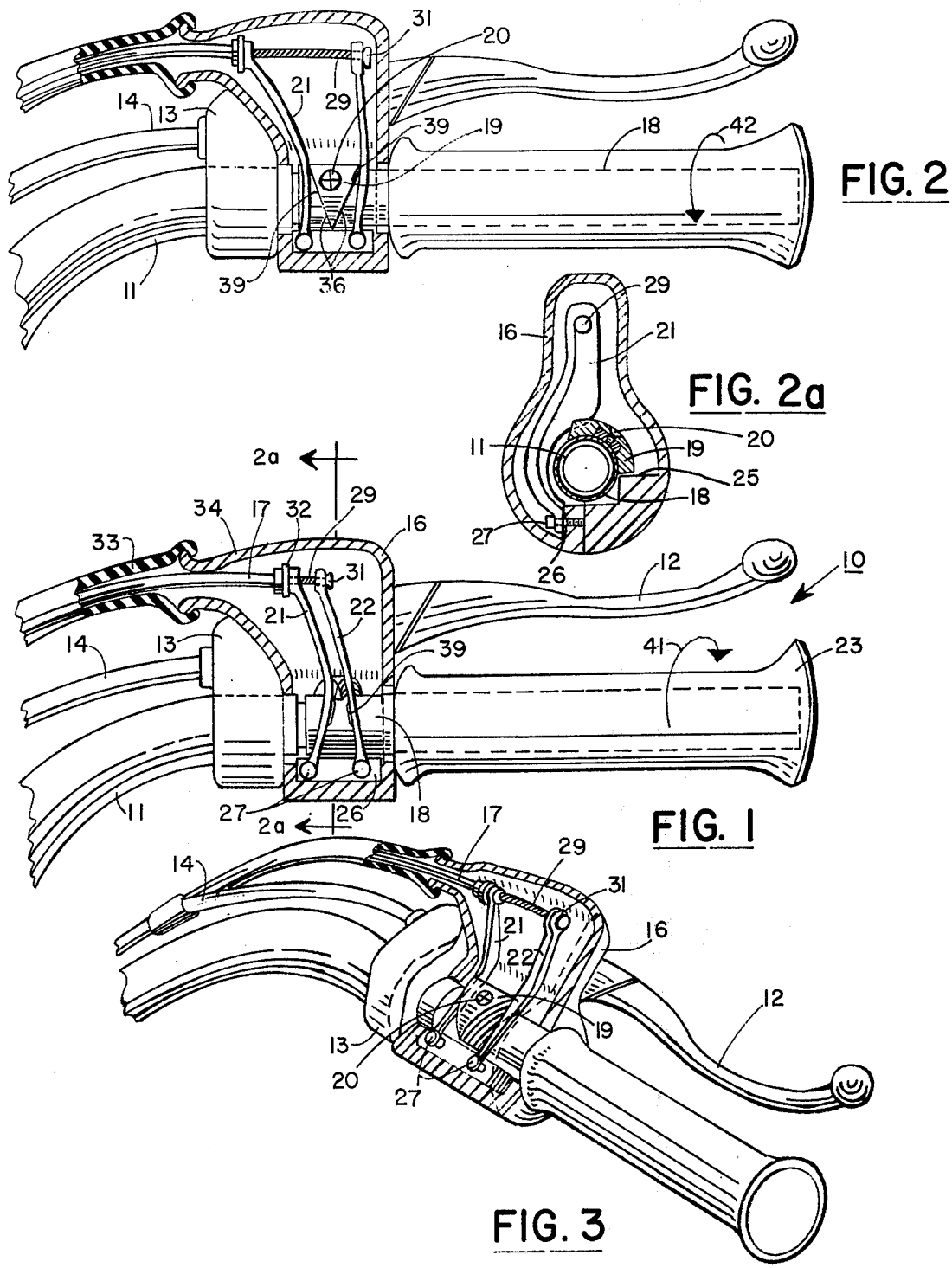

MOTORCYCLE THROTTLE TWIST-GRIP CONTROL

BACKGROUND OF THE INVENTION

This invention concerns actuators for remotely controlling operative mechanisms, and specifically relates to an improved motorcycle throttle control unit for mounting on the handle bar for actuating the carburetor disposed beneath the motorcycle seat.

Motorcycle throttle control units of the prior art have generally taken the configuration of a rotatable drum on which the inner member of a Bowden cable is connnected. Upon rotation of the dru, the Bowden cable member wound onto the drum to effect relative movement between the cable members and consequent control of the carburetor. The outer member of the Bowden cable was generally abutted against the housing of the control unit and the drum was rotated in union with the twist-grip handle. The cable members joined the unit at a right angle, generally, and were thus exposed to wear and breakage.

These prior art throttle control units have the characteristics of being mechanically severe in action upon the inner throttle cable causing it to stretch, to deform, and often breaking individual cable fibers. Further, the prior art constructions were limited as to the rate of control that could be effected by rotation of the twist-grip handle and it was not possible to coordinate readily the rotational movement of the handle to the performance curve of the engine to achieve, when desired, a uniform correspondence between degree of handle rotation and power output of the engine as controlled through the throttle opening. The prior art control units were basically of similar construction irrespective of the vast different scales of performance achieved by the various motorcycle engines for which they were installed, and consequently very little attention was paid to adapting the throttle control twist-grip to function in a specific manner for a specific type of motorcycle engine.

SUMMARY OF THE INVENTION AND OBJECTS

In summary, the invention resides in a remote control actuator which translates rotational angular movement to linear movement and includes a base member and at least one lever arm pivotly mounted with respect to said base member. A rotatable member is arranged for rotational movement about an axis of about 90 degrees with respect to said base member and cam means movable with the rotatable member has a rise in cam profile at least equal to the desired length of linear movement, the cam means serving to urge the lever arm to pivot on the base as the rotatable member is moved. A control cable including an inner cable member slidably movable with respect to a co-axially arranged outer cable member arranged so that one of the cable members is anchored upon and movable with the lever arm. And means independent of the lever arm serve to hold the other one of the cable members as the first named cable member is shifted in response to movement of the lever arm by the cam means.

An object of the invention is to provide an improved motorcycle throttle control unit which permits linear movement of the control cable without being or twisting of the control cable during the actuation phase, the cable movement being generally parallel to the associated portion of the handlebar.

Another object of the invention is to provide a motorcycle throttle control unit where the rate of cable movement may be uniform over both the initial rotation of the throttle handle grip as well as in the final degrees of rotation.

Another object of the invention is to provide a structure of the type described wherein replaceable cam means are provided to permit the selective changing of the rate of control cable movement in relation to the degrees of rotation of the throttle handle grip.

Another object of the invention is to provide a motorcycle throttle hand grip in which stop means are provided to eliminate stretch of the control cable.

These and other objects of the invention will be clearly understood from the following detailed description of the preferred embodiments, taken in consideration with the drawings described below.

BRIEF DESCRIPTION OF THE DRAWINGS

FIG. 1 is a plane view, partially in section, of one preferred form of the invention showing the remote control actuator in one control condition;

FIG. 2 is a view like FIG. 1 but illustrating another control condition of the embodiment illustrated in FIG. 1;

FIG. 2A is a sectional view in the direction of the arrows 2A—2A in FIG. 1;

FIG. 3 is a perspective view, partially in section, showing the actuator in the condition depicted in FIG. 2;

DESCRIPTION OF THE PREFERRED EMBODIMENTS

Figure 5:
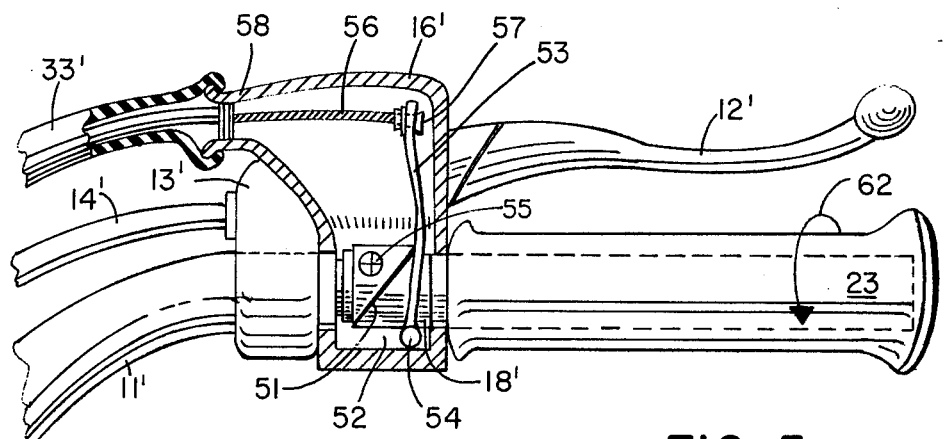
FIG. 5 is a view like FIG. 4 showing the control unit in another control condition.

One preferred embodiment of my improved motorcycle throttle, twist-grip assembly 10 is shown in FIGS. 1 through 3 of the drawings.

The twist-grip assembly 10 is illustrated operatively mounted upon the right hand portion of the motorcycle handle bar 11 (shown fragmentarily). Also mounted on the handle bar 11 is the conventional front brake lever assembly 12 including its housing 13 and front brake cable 14 which may be of conventional construction.

The motorcycle twist-grip assembly 10 includes an outer housing 16, a Bowden cable 17, a sleeve 18 rotatable with respect to the handle bar 11, a dual rise cam 19 arranged on the sleeve 18, and first 21 and second 22 lever arms pivotly mounted to the housing 16.

The housing 16 is of hollow, shell-like construction and may be formed in halves, the lower half being shown in full lines and the upper half being shown fragmentarily in broken lines in FIG. 3. At the wall to the left in the drawings, the housing 16 encircles the adjacent portion of the handle bar 11 and the rotatable sleeve 18 extends through the opposite wall of the housing terminating adjacent to the inside of the first mentioned wall, as shown clearly in FIGS. 1 and 2. The sleeve 18 is received over the free end of the handle bar and is dimensioned for smooth rotational movement with respect to the end portion of the handle bar. A rubber sheath 23 encloses the major portion of the sleeve 18 and furnishes a secure gripping surface for the operator's right hand, as is well accepted in the field.

Structure is provided in the housing 16 to define a base 26 upon which the first 21 and second 22 lever arms are mounted for pivotal movements about the axes of the fasteners 27. The pivot arms 21, 22 extend laterally of the sleeve 18 from the base 26 and project outwardly of the sleeve, terminating in free ends each having an aperture for receiving therethrough the inner cable member 29 of the Bowden cable 17. The end of the cable member 29 is equipped with a lug 31 which resists the tendency of the inner cable member from being drawn through the aperture of the second lever arm 22 and thereby effects an anchoring of the cable member 29 to the lever arm 22. The free end portion of the first pivot arm 21 is enlarged so as to furnish an abuttment 32 for the outer member of the Bowden cable 17. A protective sheath 33 is arranged about the Bowden cable 17 and closes an opening 34 in the housing serving to block entry of dust and other debris into the housing 16.

The wedge-shaped, dual-rise cam 19 is replaceably mounted on the sleeve 18 by the fastener 20 and rotatable therewith serves to urge apart the first 21 and second 22 pivot arms for effecting relative movement between the outer and inner members of the Bowden cable 17. More specifically, referring to FIG. 2, it will be observed that the cam 19 is shaped in the form of an isosceles triangle and has inclined contact or cam surfaces 36 on either side thereof. The rise of each cam surface is defined by one-half the length of the base of the triangular cam 19. The opposite ends of the cam serve as a rotational stop for the sleeve 18 by engaging portions of the housing such as the base 26, FIGS. 1 and 3, and the wall 25, FIG. 2a.

A contact zone 39 on each pivot arms 21, 22 is equipped with a wear surface configurated to engage and smoothly follow the surface of the cam 36 so that the arms will closely follow the cam as the cam is rotated from a first position as illustrated in FIG. 1 to a second position as illustrated in FIGS. 2 and 3 during its course of travel. This movement is substantially one-quarter of a turn or about 90° rotation of the sleeve 18 upon the handle bar 11.

The cam profile may be designed to comport best with the engine's power or torque deliver characteristics and the cam 19 may be dismounted by removal of the fastener 20 and replaced by a cam having other characteristics. For example, 80 percent of engine torque may be desired in the first 45° rotation of the grip 10 and a cam contour would be provided to give the large rise in the initial 45° of rotation.

OPERATION

The motorcycle twist-grip 10 is installed upon the handle bar 11 of the associated motorcycle (not shown) and the end of the Bowden cable 17 is connected to the movable slide of the carburetor which is equipped with a restoring spring which acts on the cable 17 as is well-known in the field. The sleeve 18 is provided with the rubber sheath 23 and the Bowden cable 17 is united to the pivot or control arms 21, 22 so that the inner member 29 of the Bowden cable is anchored, e.g., fixedly secured to the free end of the second control arm 22 while the outer portion of the cable 17 abutts against the portion 32 of the upper control arm 21. The configuration of the cam 19 was selected for optimum compatibility with the characteristics of the motorcycle engine so that the degree of rotation of the twist-grip will be related to the performance capability e.g. torque or horsepower curve, of the engine. In the present illustration of FIGS. 1–3 the cam is linear in that the measure of rise is uniform between the first 45° and second 45° of rotation and thus the linear movement of the Bowden cable 17 will be uniform both during the first half and second half of sleeve rotation.

Referring to FIG. 1, the pivot arms are indicated as being placed in their most proximal relationship by rotation as indicated by the arrow 41 of the throttle twist-grip into the closed position. In this condition the rear edge of the cam 19 abutts portions of the casing deterring further movement of the sleeve and cam and establishing a fixed closed stop for the control. When rotated in the direction of the arrow 42 as indicated in FIG. 2, the maximum separation of the ends of the pivot arms 21, 22 is achieved thereby achieving a maximum opening of the carburetor throttle. The spring included in the throttle assembly serve to return the pivot arms to the closed condition as shown in FIG. 1 upon release of the operator's rotative force on the handle portion 23. It will be observed that the spacing of the two pivot axes defined by the fasteners 27 is substantially equal to the combined rise of the two cam surfaces 36 or base length of the triangular cam 19. Thus, the unit precludes a stretching action upon the cable and maintains the cable motion linear and contrasted to the arcuate or curved action of the prior art.

SECOND PREFERRED EMBODIMENT

Figure 4:
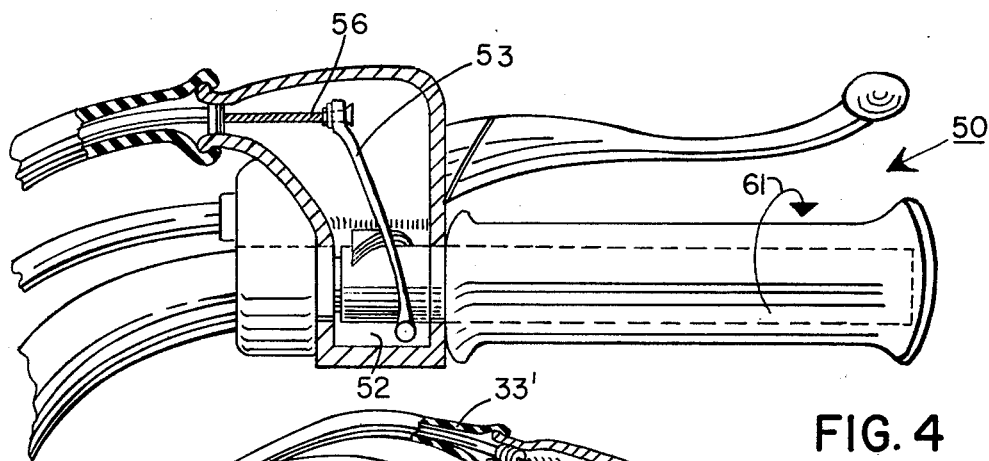
FIG. 4 is a view like FIG. 1 but illustrating a second preferred form of the invention.
Figure 6:
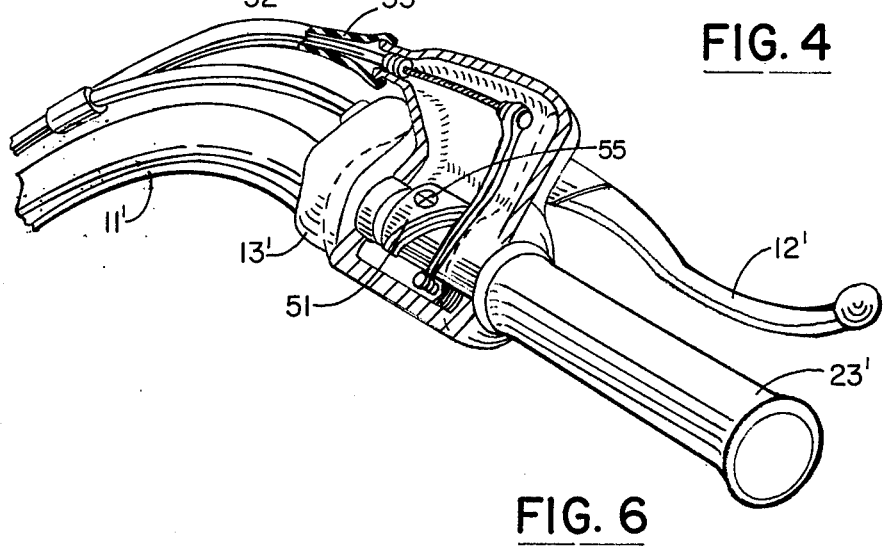
FIG. 6 is a perspective view of the unit in the condition as shown in FIG. 5.

A second preferred embodiment 50 of the invention is shown in FIGS. 4–6 and includes the following parts which have been previously described and thus are here listed with a prime [']: the handle bar 11', brake lever assembly 12', brake lever housing 13', cable for the brake lever 14', the housing for the motorcycle twist-grip 16', Bowden cable 17', rotatable sleeve 18', rubber sheath 23', and protective sheath 33'.

The motorcycle twist-grip assembly 50 is equipped with a single rise cam 51 shaped in plan like a right triangle and mounted to curve about the rotatable sleeve 18' and is removably secured thereto by the fastener 55. A base 52 is provided by the housing portion 16' and a pivot arm 53 is mounted to the base 52 for pivotal movement about the axis defined by the fastener 54. The other end of the pivot arm 53 is equipped with a suitable aperture for receiving the inner member 56 of the Bowden cable 17' which is secured to the arm by means of a lug 57. The outer member of the cable 17' engages an abuttment 58 provided by the housing 16' so that movement of the pivot arm 53 will shift in a linear motion the inner cable 57 with respect to the outer member of the Bowden cable unit 17'.

The cam member 51 has a single cam surface with a rise designed to accommodate the full length of movement of the cable member for effecting the desired degree of control over the throttle. Thus, as the twist-grip 23' is rotated in the direction of the arrow 61, FIG. 4, the pivot arm 53 is urged by the restoring power of the spring in the carburetor to the position shown in FIG. 4 which is the closed or innermost position. When the twist-grip is rotated in the direction of the arrow 62, FIG. 5, the cam urges the arm 53 to the position there shown which is the open-most position of the device controlled by the Bowden cable 17'.

It will be apparent from the above that there has been shown and described an improved remote control actuator which will serve to translate rotational movement of a twist-grip into linear movement of a Bowden cable. Although there has been shown two preferred embodiments, it is also contemplated that, for example, the functions disclosed herein can be achieved by reversal of the anchoring points on the outer Bowden cable members 17' as illustrated in FIG. 4. More specifically, it is contemplated by the spirit of the invention and its claims that the outer Bowden cable could be actuated by a pivot arm while the inner Bowden cable could be anchored to the right side of the housing as viewed in FIG. 4. While these and other variations will occur to those skilled in the art, the present invention is intended to be limited only by the claims which follow.

I claim:

1. In a remote control actuator serving to translate rotational angular movement to linear movement, the combination comprising a base member, at least one lever arm pivotally mounted with respect to said base member, a rotatable member arranged for rotational movement about an axis of about 90° with respect to said base member, cam means movable with said rotatable member and having a rise in cam profile at least equal to the desired length of linear movement, said cam means being arranged to urge said lever arm to pivot with respect to said base as said rotatable member is moved, control actuator cable means including an inner cable member slidably movable with respect to a co-axially arranged outer cable member, one of said cable members being anchored upon and movable with said lever arm, and means independent of said one lever arm,
    operative to oppose the movement of the other one of said cable members when said first mentioned cable member is moved by said lever arm permitting relative movement between said cable members as said first cable member is shifted in response to movement of said lever arm by said cam means.

2. The remote control actuator of claim 1 wherein said last named means comprises a second lever arm pivotly mounted with respect to said base member and arranged for cooperation with said cam means to pivot said arm on said base as said rotatable member is moved.

3. The remote control actuator of claim 2 wherein said cam means include a cam profile for actuating each of said first and second lever arms, said cam being dismountably secured to said rotatable member.

4. The remote control actuator of claim 1 wherein said last named means comprises a housing member rigid with said base member, the inner one of said cable members being anchored to said lever arm, the outer one of said cable members being anchored to said housing member.

5. The remote control actuator of claim 4 wherein said cam means include a single profile having a rise equal to the entire length of the desired linear movement, said cam means being dismountably secured to said rotatable member.

6. The remote control actuator of claim 1 wherein stop means are provided rigid with said base member serving to engage said cam means for limiting rotational movement of said rotatable member.

7. In a motorcycle twist-grip control assembly the combination comprising, a sleeve member adapted to be received over the free end of the motorcycle handle bar and to be rotatable with respect thereto, a housing adapted to be fixedly secured to said handle bar and having an opening therein receiving therethrough said sleeve member, said housing member having arranged therein and rigid therewith a base member, cam means on said sleeve member and rotatable therewith and having a cam profile at least equal in rise to the desired length of linear movement required of said unit, at least one lever arm pivotly mounted with respect to said base member, said cam means being arranged to urge said lever arm to pivot on said base member as said sleeve member is rotated, a Bowden cable, one of the cable members thereof being anchored upon and removable with said lever arm, and means independent of said one lever arm serving to oppose movement of the other one of said Bowden cable members when said first mentioned cable member is moved by said lever arm permitting relative movement as said first cable member is shifted in response to movement of said lever arm by said cam means.

8. In a remote control actuator serving to translate rotational angular movement into linear movement, the combination comprising a base member, first and second lever arms pivotally mounted at one end to said base member with the other ends of the arms extending outwardly therefrom in the same general direction, a rotatable member arranged for movement on an axis of about 90° with respect to said base member, cam means arranged on said rotatable member and disposed for engagement with each said first and second lever arms intermediate the ends thereof, said cam means being movable with said rotatable member and having a rise in cam profile at least equal to the desired length of linear movement, said cam means serving to urge said lever arms to pivot with respect to said base as said rotatable member is moved, control-actuator cable means including an inner cable member slideably movable with respect to a co-axially arranged outer cable member, said inner cable member extending slideably through the outer end of the first one of said arms and being fixedly secured to the end of the second of said arms, said outer cable member engaging said outer end of said first lever arm, said one outer end serving to oppose the movement of said outer cable member when said inner cable member is moved by said second lever arm permitting relative movement between said outer and inner cable members in response to movement of said two lever arms by said cam means.

* * * * *